United States Patent [19]

Smith

[11] Patent Number: 5,904,986
[45] Date of Patent: May 18, 1999

[54] PROCESS FOR THE PRODUCTION OF GEL-COATED SHAPED ARTICLES

[75] Inventor: Stuart Smith, Conyers, Ga.

[73] Assignee: ECP Enichem Polimeri Netherlands B.V., Amsterdam, Netherlands

[21] Appl. No.: 08/951,489

[22] Filed: Oct. 16, 1997

Related U.S. Application Data

[60] Continuation of application No. 08/832,794, Apr. 4, 1997, which is a division of application No. 08/350,142, Nov. 29, 1994, abandoned.

[51] Int. Cl.⁶ .................................................. B32B 27/40
[52] U.S. Cl. ................................... 428/423.7; 428/423.1; 428/480; 427/372.2; 427/384; 427/400; 427/412.5; 427/393.5; 264/241; 264/331.19; 264/331.29; 264/134
[58] Field of Search ............................... 428/423.7, 423.1, 428/480, 213; 264/134, 241, 331.19, 331.29; 427/372.2, 284, 400, 412.5, 293.5; 525/50, 56, 75, 83

[56] References Cited

U.S. PATENT DOCUMENTS

| | | | |
|---|---|---|---|
| 3,644,457 | 2/1972 | Konig et al. | 560/351 |
| 4,242,406 | 12/1980 | El Bouhnini et al. | 428/236 |
| 4,844,944 | 7/1989 | Graefe et al. | 429/357 |
| 5,109,031 | 4/1992 | Snider | 521/99 |
| 5,596,021 | 1/1997 | Adembri et al. | 521/99 |

*Primary Examiner*—Paul Thibodeau
*Assistant Examiner*—D. Lawrence Tarazano
*Attorney, Agent, or Firm*—Oblon, Spivak, McClelland, Maier & Neustadt, P.C.

[57] ABSTRACT

The present invention provides a process for producing gel-coated, shaped articles wherein the total processing time is decreased compared to conventional processes and the physico-mechanical properties of the gel-coated, shaped articles produced therefrom are maintained.

21 Claims, No Drawings

PROCESS FOR THE PRODUCTION OF GEL-COATED SHAPED ARTICLES

This is a continuation, of application Ser. No. 08/832,794 filed on Apr. 4, 1997, pending which is a divisional of 08/350,142 filed Nov. 29, 1994, now abandoned.

BACKGROUND OF THE INVENTION

1. Field of the Invention

This invention relates to a process for producing gel-coated, fiber-reinforced shaped articles wherein the total processing time is substantially decreased compared to conventional processes, and the physico-mechanical properties of the gel-coated, shaped articles produced therefrom are maintained.

2. Discussion of the Background

Gel-coated, fiber-reinforced shaped articles are conventionally used to produce bathroom fixtures such as bath tubs, sinks and shower stalls; recreational applications such as boat hulls, canoes and kayaks, as well as panels, especially for roofing, walls and doors of industrial buildings or recreational vehicles.

Gel-coated fiber-reinforced shaped articles are usually prepared from thermosetting resins, in particular from unsaturated polyester resins prepared by polycondensing diols and polycarboxylic acids, either or both of which contain reactive double bonds. The so-obtained product is then mixed with a reactive monomer, e.g., styrene, in order to have cross-linking during polymerization.

When the resin is to be used, filler, e.g., glass fibers or inorganic powders are mixed with it. The amount and kind of filler affect the strength, flexibility, and cost of the product. Thixotropic agents may be used to control the viscosity and prevent the mix from draining from sloping surfaces. Pigments can be used to provide color while UV absorbers can be used to provide outdoor stability. A peroxide catalyst and a combination of a cobalt salt and, possibly, a tertiary amine are then added as accelerators for the crosslinking reaction between the unsaturated polyester and the reactive monomer.

In fabricating jacuzzis, shower stalls, bath tubs, etc., a layer of polyester resin system as above described, containing no fiber reinforcement, is applied first to the surface of a mold (gel-coat). It forms a smooth, strong, impervious, durable chemical-, weather-, and wear-resistant surface. An additional, thicker layer of the resin, which is usually reinforced with glass fiber, is then applied by hand lay-up or by spray gun. The article is then cured at room or higher temperature.

More particularly, the preparation process consists of:
(a) spraying onto the surface of a mold, previously treated with releasing agents, a first layer (gel-coat) of an unsaturated polyester resin system (polyester resin plus catalyst plus additives) which forms the external surface of the molded article;
(b) partially curing the gel-coat (this step usually requires about 40 minutes);
(c) spraying onto the partially cured gel-coat layer a second and thicker layer of an unsaturated polyester resin system mixed with chopped glass fibers; and
(d) further curing the polyester resin, both of the first and the second layer, in an oven at about 200° F. (this step usually requires an additional 80–90 minutes). The total cycle time for such a preparation is about two hours.

It is desirable to decrease the total cycle time for such processes. Unfortunately, the curing time in either of steps (b) or (d) cannot be reduced. When the process time of step (b) is reduced, insufficient curing results and the chopped glass fibers tend to penetrate the gel-coat layer leading to a worsening of the aesthetic properties of the external surface of the article. When the process time of step (d) is reduced, for example by replacing the polyester resin system of (c) with a faster curing system such as a polyurethane system, the polyester gel-coat layer and the underlying polyurethane layer do not adequately adhere to each other, leading to inadequate physico-mechanical properties of the obtained articles.

SUMMARY OF THE INVENTION

One object of the present invention is to provide a process for producing gel-coated, shaped articles wherein the total processing time is decreased compared to conventional processes and the physico-mechanical properties of the obtained gel-coated, shaped articles are maintained.

Various other objects, features and attendant advantages of the present invention will be more fully appreciated as the same becomes better understood from the following detailed description.

The inventor has now discovered such a process. The process of the present invention comprises the steps of:
a) applying onto the surface of a mold, previously treated with releasing agents, a gel-coat layer of an unsaturated polyester resin system (this layer will represent the external surface of the molded articles);
b) applying onto the gel-coat layer, after 5–7 minutes, a "backer layer" consisting essentially of:
   i) 50–75% by weight of an unsaturated polyester resin;
   ii) 3–25% by weight of a quasi-prepolymer having a free -NCO content in the range of from 16 to 27%;
   iii) 0.5–5% by weight of a curing system consisting essentially of:
      (A) a catalyst for the unsaturated polyester resins;
      (B) at least one accelerator for the polyester resins; and
      (C) optionally an isocyanate trimerization catalyst;
   iv) from 0 up to the complement to 100% by weight of additives to regulate thixotropic behavior or to improve strength and reduce shrinkage of the backer layer;
c) applying onto the backer layer, after 5–8 minutes, a layer consisting of a polyurethane system optionally mixed with reinforcement materials; and
d) curing the so-obtained composite;
wherein the total processing time for steps (a)–(d) is about 12 to 25 minutes, preferably 14–20 minutes.

In a second embodiment, in step (c) the polyurethane system may be replaced with the backer layer composition itself.

In a third embodiment, in step (c) the polyurethane system may be replaced with an unsaturated polyester resin system while still maintaining a low processing time for the overall process.

Articles obtained from the process of the present invention are endowed with excellent mechanical properties due to the strong adhesion between layers promoted by the backer layer. For instance, articles physical and mechanical characteristics remain essentially unchanged even after long immersion time in boiling water.

DETAILED DESCRIPTION OF THE PREFERRED EMBODIMENTS

Suitable releasing agents which are used to pretreat the surface of the mold include any compound conventionally used such as canaba wax, teflon-containing wax and fatty acid type wax.

Suitable polyester resin systems useful for producing the gel-coat layer in step (a) include polyester resin, a catalytic system and additives.

Suitable polyester resins include all conventional unsaturated polyester resins such as those formed by polycondensing at least a diol component with at least a is polycarboxylic component and containing a reactive curing monomer.

The diol component of the polyester system can be for example $C_{2-20}$ alkanediol or aryldiol such as ethylene glycol, diethylene glycol, triethylene glycol, polyethylene glycol, propylene glycol, dipropylene glycol, polypropylene glycol, 1,3-butanediol, 1,4-butanediol, neopentyl glycol (NPG), cyclohexanedimethanol, 2,2,4-trimethylpentanediol, bisphenol A, trimethylolethane, trimethylolpropane, dicyclopentadiene glycol or dibromoneopentyl glycol. Preferably, propylene glycol and neopentyl glycol are used.

The polycarboxylic component of the polyester resin can be, for example, a $C_{4-28}$ alkenyl di-acid and aryl di-acids or anhydrides thereof such as be maleic anhydride, fumaric acid, phthalic anhydride, isophthalic acid, terephthalic acid, trimellitic anhydride, anhydrides of chlorendic, tetrabromophthalic and tetrachlorophthalic acids, itaconic anhydride, citraconic anhydride, mesaconic anhydride, or aconitic acid. Unsaturated polyester resins containing orthophthalic anhydride (orthophthalic polyester resin) or isophthalic acid (isophthalic polyester resin) are preferred. Unsaturated polyester resins based on maleic anhydride and phthalic anhydride are even more preferred.

The preferred reactive curing monomer is styrene.

Polyester resin can be formed using conventional techniques such as those described in SPI Handbook of Technology and Engineering or Reinforced Plastics/Composites, Van Norstrand Reinhold Company, N.Y.

A catalytic system useful in the polyester resin system for the crosslinking reaction can be based on organic peroxides such as methyl ethyl ketone peroxide (MEKP) and accelerators such as cobalt salts and tertiary amines.

The unsaturated polyester resin system is prepared by admixing 100 parts by weight (pbw) of a polyester resin, 1 to 5 pbw of a catalytic system and 20 to 40 pbw of additives. The unsaturated polyester resin system is sprayed onto the mold and allowed to cure for 2–10 minutes, preferably 5 to 7 minutes, at a temperature of 75 to 100° F., preferably 85 to 95° F.

The gel-coat layer can be applied onto the mold using conventional techniques such as those described in SPI Handbook of Technology and Engineering or Reinforced Plastics/Composites, Van Norstrand Reinhold company, N.Y. The thickness of the gel-coat layer is typically of from 10 to 20 mils, preferably 15 to 20 mils.

Suitable unsaturated polyester resins (i) useful in step (b) as the backer layer include those listed above. Preferably, orthophthalic and isophthalic polyester resin is used.

Suitable isocyanate quasi-prepolymer (ii) useful in step (b) can be the reaction product of an isocyanate component and a polyether polyol component.

The isocyanate quasi-prepolymer has a final free -NCO content of from 16 to 27% by weight, based on the total weight of the quasi-prepolymer. The isocyanate quasi-prepolymer is prepared by reacting an isocyanate component containing at least two NCO groups with a polyether polyol. Isocyanate quasi-prepolymer obtained by reacting an isocyanate component containing at least two NCO groups with a polyester polyol, can also be used.

Any isocyanate components can be used in the process of the present invention. Preferred isocyanate components are methylene bis (phenylisocyanates) (MDI), polymeric MDI, uretonimine modified MDI or mixtures thereof.

Examples of commercial materials of this type are TEDIMON 300, TEDIMON 306, TEDIMON 307, TEDIMON 316 and TEDIMON 31 manufactured and sold by EniChem.

Any polyether polyol component having at least two functional groups can be used for forming the quasi-prepolymer. Examples of polyether polyol components are ethoxylated and/or propoxylated diols and triols.

The polyether polyol preferably has a number average molecular weight $M_n$ of 700 to 6,000. The preferred $M_n$ for a polyether diol component is about 2,500. The preferred $M_n$ for a polyether triol component is about 5,000.

The polyether polyol component may be made by conventional methods known to those of ordinary skill in the art. Suitable methods are described in *Kirk-Othmer Encyclopedia of Chemical Technology. 3rd Ed.*, vol. 18, p638+.

The isocyanate quasi-prepolymer can be prepared by reacting the polyol component with the isocyanate component in such an amount to get the desired free NCO content at a temperature of from room temperature (72° F.) to 300° F., more preferably 120°–200° F.

In the curing system (iii) the concentration, based on the backer layer of the catalyst (A) ranges of from 0.3 to 2.0% by weight while the concentration of the accelerator (B) from 0.2 to 3.0% by weight, the concentration of the isocyanate trimerization catalyst (C) from 0 to 0.5%.

Suitable catalysts (A) for the polyester resin useful in step (b) in the backer layer include those listed above for step (a), especially organic peroxides, preferably MEKP.

Suitable accelerators (B) for polyester resins include cobalt salts of organic acids and/or tertiary amines.

Examples of accelerators (B) are: dimethylaniline, diethylaniline etc., cobalt naphthenate, cobalt octoate, a complex of a cobalt salt, such as cobalt chloride or cobalt acetate with triethylene diamine, etc. and mixtures thereof. Said complex described in U.S. Pat. No. 3,804,799 incorporated herein by reference. PEP 183, PEP 100, PEP 308 and PEP 183-S (all produced by Air Products) are preferred. PEP 183 is particularly preferred.

Suitable isocyanate trimerization catalysts (C) include alkaline organic salts such as potassium acetate, potassium octoate, etc.

The backer layer of the present invention may also comprise further additives (iv) such as silica (Aerogil) to regulate thixotropic behavior, milled glass or Wollastonite fibers to improve strength and reduce shrinkage.

The backer layer is applied atop the gel-coat and allowed to cure for 5 to 8 minutes, preferably 5 to 6 minutes, at 75 to 125° F., preferably 85 to 95° F.

The backer layer can be applied onto the mold using conventional techniques. The thickness of the backer layer is typically of from 50 to 125 mils, preferably 80 to 100 mils.

Suitable polyurethane systems useful in step (c) in accordance with the present invention include conventional polyurethanes prepared from hydroxy terminated components and isocyanate components.

Conventional polyurethane resins are described by Saunders & Frisch "Polyurethanes Chemistry and Technology" Interscience, New York, 1964; incorporated herein by is reference.

The reinforcement materials useful in step (c) include, but not limited to, chopped or milled glass fibers, chopped or milled carbon fibers, or mineral fibers such as calcium silicate or wollastonite fibers or mica. Particularly suitable are fiberglass reinforcement fibers, particularly those having lengths of from about 1/16" to about 1/2".

The polyurethane layer is applied onto the backer layer in step (c) by using conventional techniques. The thickness of the polyurethane layer is typically of from 50 mils to the desired thickness, and it is allowed to cure in step (d) for 2 to 10 minutes, preferably 4 to 5 minutes at 75 to 125° F., preferably 85 to 95° F.

In a second embodiment, in-step (c) the polyurethane system of the present invention can be substituted with the composition of the backer layer.

In a third embodiment, in step (c) the polyurethane system may be replaced with an unsaturated polyester resin system such as described in step (a).

Gel-coated, fiber reinforced shaped articles produced using the process of the present invention are endowed with excellent physico-mechanical properties due to the strong adhesion between the layers promoted by the backer layer. For instance, these physico-mechanical characteristics remain essentially unchanged even after long immersion times in boiling water.

Having generally described this invention, a further understanding can be obtained by reference to certain specific examples which are provided herein for purposes of illustration only and are not intended to be limiting unless otherwise specified.

EXAMPLES

The following tests were conducted in accordance with the American National Standard, Z124.2, 1987 (published by the International Association of Plumbing and Mechanical Officials, Walnut Calif.).

EXAMPLE 1
Comparative Example

Mold 3'×3' plate made from polyester resin.

Mold Temp 80° F.

Step #1 NPG-isophthalic polyester resin gel-coat (a neopentyl-isophthalic bath tub gel-coat available from CCP, St. Louis) was sprayed onto a mold at 20 mils with 2% MEKP catalyst.

Cure Time The gel coat was cured for 40 minutes.

Step #2 Orthophthalic polyester resin was catalyzed with 2% MEKP (Hi/Point-90 which is a 9% active oxygen MEKP available from Witco Corp., New York) and standard dimethylaniline (DMA) and cobalt naphthenate (0.4% Co and 0.2% DMA) and sprayed with chopped glass onto the gel coat at 125 mils. The glass was rolled out and the mold was placed in an oven at 200° F. The total cycle time was about 2 hours.

The so-obtained sample showed the following physico-chemical properties:

tensile strength 4120 psi elongation 0.53% flexural strength 5100 psi flexural modulus 524,000 psi

EXAMPLE 2
Example according to the present invention

Step #1 NPG-isophthalic polyester resin gel coat catalyzed with 2% MEKP was sprayed onto the same mold as described in Example 1.

Step #2 After 7 minutes approximately 60 mils of a backer layer with the following composition was applied by spraying:

100 pbw orthophthalic polyester resin with an equivalent weight of 1400;

15 pbw quasi-prepolymer 25% free-NCO formed from Tedimon 316 (a uretonimine modified MDI available from Enichem) and TEXOX WL 1400, (a 2500 MW polyether diol from TEXACO) mixed at 150° F. for one hour under stirring.

25 pbw Wollastonite;

1 pbw Aerosil;

1 pbw Pep 183;

2 pbw MEKP;

0.4 pbw cobalt naphthenate; and 0.2 pbw dimethyl aniline.

Step #3 After 7 minutes (when the gel point of the backer layer was obtained), a rigid polyurethane composition (EC 1062, available from Enichem) was spray applied onto the backer layer with 15% chopped glass fibers, 12 mm long. No roll out was necessary. The composition cured in 5 minutes and then demolded.

The so-obtained sample showed the following physico-mechanical properties.

Tensile strength 4,160 psi

Elongation 0.8%

Flexural strength 11,630 psi

Flexural modulus 506,000 psi

Heat aging test was run at 212° F. for 24 hours on the sample. No change in properties was observed.

A boiling test was carried out for 100 hours on the samples of Examples 1 and 2. No differences between samples were detected.

QUV testing was carried out using a QUV testing machine with a 313 bulb. Testing of the sample according to the present invention (Example 2) exceeded positively 800 hours, which represents over 5 years.

EXAMPLE 3
Comparative Example

Example #2 is repeated without using the backer layer. Adhesion between the gel coat and polyurethane layer was poor causing a boiling test failure.

EXAMPLE 4
Comparative Example

Example #2 was repeated using, in the backer layer, polymeric MDI having 31% free-NCO instead of the quasi-prepolymer. Poor results were achieved. Blistering occurred on the back side of the sample and dimples formed in the surface coat.

EXAMPLE 5
Example according to the present invention

Example #2 was repeated by using the following pre-polymers:

T-316/WL 1400,

T-341/WL 1400,

T-316/1264

T-341/1264 and

T-316/Ter 838.

T-316, Tedimon-316, is a uretonimine modified MDI, available from Enichem. T-341, Tedimon-341, is a medium functionality modified polymeric MDI, available from Enichem. 1264 is a 4800 MW triol with 75/25 EO/PO random polyol, available from Enichem. Ter 838 is a propoxylated/ethoxylated, 4000 MW diol polyether (available from Enichem).

The prepolymer has been used with a 5% excess over the stoichiometric ratio with the unsaturated polyester resin.

The results reported in the following Table were obtained after heat aging was run at 100° C. for 24 hours on the composite.

100 hours of boiling tests on the composite were performed. No differences between a control (Example 1) and the samples could be detected.

800 hours of QUV testing showed no change in properties.

|  | % NCO | Tensile Strength (PSI) | % Elong. | Flex. Strength (PSI) | Flex. Mod. (PSI) |
|---|---|---|---|---|---|
| T-341/WL 1400 | 25 | 4,710 | 0.9 | 12,640 | 499,610 |
| T-341/1264 | 25 | 4,640 | 1.1 | 11,180 | 448,400 |
| T-316/1264 | 25 | 4,260 | 0.8 | 11,520 | 475,700 |
| T-316/WL 1400 | 16 | 4,800 | 0.9 | 10,080 | 384,300 |
| T-316/Ter 838 | 21 | 3,870 | 0.9 | 11,480 | 453,600 |

EXAMPLE 6

Example according to the present invention

Example #2 was repeated using isophthalic polyester resin in place of orthophthalic polyester resin. No difference was seen between example #2 and example #6.

EXAMPLE 7

Example according to the present invention

Example #2 was repeated with the backer layer replacing the polyurethane system in Step #3. The cure time remained the same.

The so-obtained sample showed the following physico-mechanical properties:

tensile strength 5460 psi elongation 1.3% flexural strength 6900 psi flexural modulus 516,600 psi

As expected, the boiling test carried out for 100 hours met the specified ranges.

EXAMPLE 8

Example according to the present invention

Example #2 was repeated by replacing the polyurethane system in Step #3 with a polyester resin system as used in Example 1, Step #2.

Gel coat was spray applied to the mold. After 7 minutes, 60 mils of backer was spray applied to the gel coat. After 7 minutes, a polyester resin system as described in Example 1, Step #2, was applied. Total cycle time was reduced by 25 minutes compared to Example 1.

What is claimed as new and is desired to be secured by Letters Patent of The United States is:

1. A process for producing gel-coated, shaped articles comprising the sequential steps of:
   a) applying a gel-coat layer of an unsaturated polyester resin onto the surface of a mold;
   b) applying onto said gel-coat layer, after 5–7 minutes, a backer layer composition consisting essentially of:
      i) 50–75% by weight of an unsaturated polyester resin;
      ii) 3–25% by weight of a prepolymer having a free -NCO content in the range of from 16 to 27%;
      iii) 0.5–5% by weight of a curing system consisting essentially of:
         (A) a catalyst for the unsaturated polyester resins;
         (B) at least one accelerator for the polyester resins; and
         (C) optionally, an isocyanate trimerization catalyst;
      iv) solid additives in the amount ranging from 0% by weight up to the complement of 100% by weight wherein all percent weights are based on the weight of said backer layer;
   c) applying onto said backer layer, after 5–8 minutes, a layer selected from the group consisting of a polyurethane resin, the backer layer composition, and an unsaturated polyester resin optionally mixed with reinforcement materials, forming a composite; and
   d) curing said composite.

2. The process of claim 1, wherein in step (c) said layer is a backer layer composition.

3. The process of claim 1, wherein in step (c) said layer is an unsaturated polyester resin.

4. The process of claim 1, wherein said unsaturated polyester in step (b) contains an orthophthalic polyester resin or an isophthalic polyester resin.

5. The process of claim 1, wherein said quasi-prepolymer (11) comprises a polymer formed from an isocyanate component containing at least two NCO groups and a polyether polyol component having at least two functional groups and a number average molecular weight $M_n$ of from 700 to 6,000.

6. The process of claim 5, wherein said polyether polyol component is an ethoxylated and/or propoxylated diol or triol.

7. The process of claim 1, wherein in the curing system (iii) the concentration, based on the backer layer, of the catalyst (A) ranges of from 0.3 to 2.0% by weight while the concentration of the accelerator (B) ranges from 0.2 to 3% by weight, and the concentration of the isocyanate trimerization catalyst (C) ranges from 0 to 0.5%.

8. The process of claim 1, wherein said catalyst (A) is an organic peroxide.

9. The process of claim 8, wherein said catalyst (A) is methyl ethyl ketone peroxide.

10. The process of claim 1, wherein said accelerator (B) includes cobalt salts of organic acids and/or tertiary amines.

11. The process of claim 1, wherein said accelerator (B) includes a complex of a cobalt salt with triethylene diamine.

12. The process of claim 1, wherein the thickness of the backer layer is 50–125 mils.

13. The process of claim 1, wherein in step (c) said layer is a polyurethane resin.

14. A gel-coated, shaped article comprising:
   (X) a gel-coat layer consisting of an unsaturated polyester resin;
   (Y) a layer, selected from the group consisting of a polyurethane resin, a backer layer composition, and an unsaturated polyester resin, optionally, mixed with reinforcement materials; and
   (Z) a backer layer interdisposed between said gel-coat layer and said (Y) layer, wherein said backer layer consists essentially of, based on total weight of backer layer:
      i) 50–75% by weight of an unsaturated polyester resin;
      ii) 3–25% by weight of a repolymer having a free -NCO content in the range of from 16 to 27;
      iii) 0.5–5% by weight of a curing system consisting essentially of:
         (A) a catalyst for the unsaturated polyester resins;
         (B) at least one accelerator for the polyester resins;

(C) optionally, an isocyanate trimerization catalyst; and iv) solid additives in the amount ranging from 0% by weight up to the complement of 100% by weight.

15. The article of claim 14, wherein the layer of step (Y) is a layer having the same composition as the backer layer.

16. The article of claim 14, wherein the layer of step (Y) is a layer of an unsaturated polyester resin.

17. The article of claim 14, wherein said layer of step (Y) is a polyurethane resin.

18. A gel-coated, shaped article obtained by a process comprising the steps of:

a) applying onto the surface of a mold a gel-coat layer of an unsaturated polyester resin;

b) applying onto said gel-coat layer, after 5–7 minutes, a backer layer consisting essentially of, based on total weight of backer layer:

i) 50–75% by weight of an unsaturated polyester resin;

ii) 3–25% by weight of a prepolymer having a free -NCO content in the range of from 16 to 27%;

iii) 0.5–5% by weight of a curing system consisting essentially of:

(A) a catalyst for the unsaturated polyester resin;

(B) at least one accelerator for the polyester resins; and (C) optionally, an isocyanate trimerization catalyst;

iv) solid additives in the amount ranging from 0% by weight up to the complement of 100% by weight;

c) applying onto said backer layer, after 5–8 minutes, a layer selected from the group consisting of a polyurethane resin the backer layer composition and an unsaturated polyester resin optionally mixed with reinforcement materials to form a composite; and d) curing said composite.

19. The article of claim 18, wherein said layer of step (c) is the backer layer composition.

20. The article of claim 18, wherein said layer of step (c) is an unsaturated polyester resin.

21. The article of claim 18, wherein said layer of step (c) is a polyurethane resin.

* * * * *